United States Patent [19]
Odam et al.

[11] Patent Number: 5,621,876
[45] Date of Patent: Apr. 15, 1997

[54] METHOD AND APPARATUS FOR MODIFYING A DISPLAY MATRIX IN A COMPUTER WINDOW BY ADDING ONE COLUMN OR ROW AT A TIME

[75] Inventors: Seth T. Odam, Palo Alto; James R. Harker, Los Altos; Joseph G. Ansanelli, Palo Alto, all of Calif.; John L. Welde, Jr., Pope AFB, N.C.

[73] Assignee: Apple Computer, Inc., Cupertino, Calif.

[21] Appl. No.: 418,417

[22] Filed: Apr. 7, 1995

[51] Int. Cl.⁶ .............................. G06F 17/24; G06T 3/40
[52] U.S. Cl. ........................ 395/765; 395/139; 395/340; 395/348
[58] Field of Search .................. 395/128, 139, 395/145, 148, 157, 159; 345/118, 119, 120, 121, 123, 127, 129, 130

[56] References Cited

U.S. PATENT DOCUMENTS

| | | | |
|---|---|---|---|
| 5,001,697 | 3/1991 | Torres | 395/139 |
| 5,073,771 | 12/1991 | Satta et al. | 345/127 |
| 5,227,771 | 7/1993 | Kerr et al. | 345/119 |
| 5,263,134 | 11/1993 | Paal et al. | 395/158 |
| 5,337,405 | 8/1994 | Lindauer et al. | 395/147 |
| 5,459,825 | 10/1995 | Anderson et al. | 395/133 |

OTHER PUBLICATIONS

*Running Microsoft Excel 4 for Windows*, The Cobb Group, 1992, pp. 240–242.
"WordPerfect InfoCentral Personal Information Manager, v.1.1" Novell, Inc., Sep. 1994.

*Primary Examiner*—Mark K. Zimmerman
*Assistant Examiner*—Stephen Hong
*Attorney, Agent, or Firm*—Hickman Beyer & Weaver

[57] ABSTRACT

A method of modifying a display matrix in a matrix display area in a window on a computer display screen. The method includes the steps of displaying data in a matrix format, thereby forming a display matrix in the matrix display area, the matrix display area having a first dimension, and increasing, responsive to a selection of an increase activator, the number of existing columns of matrix cells in the display matrix by adding an additional column of matrix cells to the display matrix. The method further includes the step of computing, using a central processing unit, a computed width of a column of matrix cells in the existing columns of matrix cells if the column of matrix cells is reduced in width to accommodate the additional column of matrix cells. The method also includes the steps of reducing the width of the column of matrix cells to accommodate the additional column of matrix cells within the first dimension if the computed width does not fall below a predefined minimum column width, and increasing a width of the matrix display area to accommodate the additional column of matrix cells if the computed width falls below the predefined minimum column width.

24 Claims, 13 Drawing Sheets

METHOD AND APPARATUS FOR MODIFYING A DISPLAY MATRIX IN A COMPUTER WINDOW BY ADDING ONE COLUMN OR ROW AT A TIME

BACKGROUND OF THE INVENTION

This invention relates generally to computer systems and to displays on computer display screens. More particularly, the present invention relates to apparatus and methods for modifying a display matrix in a display window in a discrete, stepwise manner.

Windows are often used with computer systems implementing graphical user interfaces (GUIs). Many people find that computers having GUIs are easier to learn and use than comparable computers without GUIs. Computers having GUIs include desktop units, such as the popular Apple™ Macintosh™ and IBM™-compatible computers, notebooks and subnotebooks, such as the popular Apple™ Powerbooks™ and IBM™ ThinkPads, as well as pen-based computers such as the Apple™ Newton™. For ease of understanding and without limiting the scope of the invention, a Power Macintosh™ computer system manufactured by Apple™ Computer Inc. of Cupertino, Calif. is selected for illustration purposes. However, it should be noted that the discussion below is equally applicable to computers of other makes and models.

FIG. 1 shows a typical prior art GUI screen on a computer screen 10. Computer screen 10 represents the area within which images, texts, and other types of data objects can be displayed and manipulated. On an Apple Power Macintosh, computer screen 10 often includes a desktop image 14 which is produced by a Macintosh operating system. Desktop image 14 often includes a menu bar 18 and a desktop display area 20. Within desktop display area 20, shown are a number of icons 22, 24 and 26 representing different objects. For example, icon 22 represents a hard disk drive, icon 24 represents a "trash can" in which files can be deposited to be deleted, and icon 26 represents a folder entitled "desk stuff," which may contain application programs and files of various types.

Menu bar 18 preferably includes a number of menu labels 28, 30, and 32 for implementing pop down menus, as are well known to Macintosh users. Desktop image 14 also includes a screen cursor shown in the form of an arrow 34. The screen cursor works in cooperation with a pointing device, for example, a trackball, a mouse, a joystick, special keys on a computer keyboard, or the like. As is well known to those of skill in the art, the screen cursor may be moved to different positions on computer screen 10 and may assume different forms.

There is also shown in FIG. 1 a window 16 within desktop image 14. Window 16 represents an instance of a utility program known as Finder™, also manufactured by Apple Computer, Inc. of Cupertino, Calif. In a typical GUI environment, there are often multiple windows simultaneously open on computer screen 10, each of which may be an instance of a particular application program. At the top of window 16, shown is a title bar 36. As shown in FIG. 1, title bar 36 identifies the current window as "A Folder." Each window has associated with it a window display area 37 within which information from a data set associated with window 16 may be displayed and manipulated. Optional vertical scroll bar 38 and horizontal scroll bar 40 are preferably located at the vertical and horizontal edges of window 16. Window 16 can be moved around desktop display area 20, preferably by dragging on title bar 36. Window 16 can also be resized, preferably by dragging a size box 42 to expand or contract window 16. Further, window 16 can also be closed, preferably by clicking on a close box 44 in the upper left corner of window 16.

Windows sometimes include information regarding the software currently under use and the current system capacity. In FIG. 1, textual information box 46 in window 16 indicates that there is currently 0 item in "A Folder," 53.2 megabytes of total memory capacity on a disk storage device, of which 9.7 megabytes of memory is available. The functions and use of the aforementioned items, which are typical in a GUI environment, are well known to those familiar with the Apple™ Macintosh™.

In certain types of display windows, information may be more clearly conveyed to the user and manipulable when displayed in a matrix format. Examples of application programs that display information to the user in a matrix format include spreadsheet programs, e.g. ClarisWorks™ by Claris Corp. of Santa Clara, Calif., personal information manager programs, e.g. Claris Organizer™, manufactured by the aforementioned Claris Corp., or word processing programs that manipulate text displayed in newspaper column styles.

Often times, a user viewing a display matrix wishes to view one additional column or row of matrix cells. To add an additional column or row of matrix cells to the existing display matrix, a user in the prior art manually increases the size of the display window by dragging on a window size box, thereby displaying more of the display matrix. Manually increasing the size of the display window to view an additional column or row of matrix cells is, however, an inconvenient and indirect way to accomplish what the user really wants, i.e. to add an additional column or row of matrix cells to the existing display matrix. Further, when a display window is already at its maximum size, e.g. occupying the entire computer display screen, it is not possible to further increase the size of the display window to add an additional column or row to the existing display matrix.

Another prior art method permits the user to reduce the size of existing cells to create additional room in the display window to accommodate an additional column or row of matrix cells. The reduction in the size of existing cells is typically accomplished by manually changing the size of existing cells in the display window, e.g. by dragging on an edge of a cell or a group of cells. However, this manual operation is also an inconvenient and indirect way of accomplishing the addition of an additional column or row of matrix cells to the existing display matrix. Further, this prior art method needlessly requires the user to exercise judgment regarding the appropriate cell size. To optimally display the additional column or row of matrix cells in the window matrix display area, a user often has to experiment in a trial-and-error fashion with different cell sizes.

Consequently, what is needed is an improved apparatus and method for modifying a display matrix in a display window in a discrete, stepwise manner. The improved method and apparatus preferably adds or removes a row or column of matrix cells responsive to a user's command, and adjusts the display matrix to accommodate the addition or removal such that cells are displayed in an efficient manner in the matrix display area.

SUMMARY OF THE INVENTION

The invention relates to, in one aspect, a method of modifying a display matrix in a matrix display area in a window on a computer display screen. The method includes the steps of displaying data in a matrix format, thereby forming a display matrix in the matrix display area, the matrix display area having a first dimension, and increasing, responsive to a selection of an increase activator, the number of existing columns of matrix cells in the display matrix by adding an additional column of matrix cells to the display matrix. The method further includes the step of computing, using a central processing unit, a computed width of a column of matrix cells in the existing columns of matrix cells if the column of matrix cells is reduced in width to accommodate the additional column of matrix cells. The method also includes the steps of reducing the width of the column of matrix cells to accommodate the additional column of matrix cells within the first dimension if the computed width does not fall below a predefined minimum column width, and increasing a width of the matrix display area to accommodate the additional column of matrix cells if the computed width falls below the predefined minimum column width.

In another aspect, the invention relates to a method of modifying a display matrix in a matrix display area in a window on a computer display screen, including the steps of displaying data in a matrix format, thereby forming a display matrix in the matrix display area, the matrix display area having a first dimension, and increasing, responsive to a selection of an increase activator, the number of existing rows of matrix cells in the display matrix by adding an additional row of matrix cells to the display matrix. The method further includes the step of computing, using a central processing unit, a computed height of a row of matrix cells in the existing rows of matrix cells if the row of matrix cells is reduced in height to accommodate the additional row of matrix cells. The method also includes the steps of reducing the height of the row of matrix cells to accommodate the additional row of matrix cells within the first dimension if the computed height does not fall below a predefined minimum row height, and increasing a height of the matrix display area to accommodate the additional row of matrix cells if the computed height falls below the predefined minimum row height.

In yet another aspect, the invention relates to an apparatus for modifying in a discrete, stepwise manner a display matrix comprising of matrix cells arranged in rows and columns in a matrix display area having a first dimension in a window on a computer display screen, including an increase activator means, and means for increasing, responsive to a selection of the increase activator means, the number of existing columns of matrix cells in the display matrix by adding an additional column of matrix cells to the display matrix. The apparatus further includes means for computing a computed width of a column of matrix cells in the existing columns of matrix cells if the column of matrix cells is reduced in width to accommodate the additional column of matrix cells, wherein the width of the column of matrix cells is reduced to accommodate the additional column of matrix cells within the first dimension if the computed width does not fall below a predefined minimum column width, the width of the matrix display area is increased if the computed width falls below the predefined minimum column width. The apparatus also includes a decrease activator means, and means for reducing, responsive to a selection of the decrease activator means, the number of existing columns of matrix cells in the display matrix by removing a column of matrix cells chosen for deletion from the display matrix, wherein the matrix display area retains a dimension it has prior to the reducing step.

DESCRIPTION OF THE PREFERRED EMBODIMENT

Physical Embodiment

It should be noted that the invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, windows, matrix, display areas, cells, objects, or the like. It should be remembered, however, that all of these and similar terms are to be associated with the appropriate physical quantities and are merely convenient labels applied to these quantities.

Further, the manipulations performed are often referred to in terms, such as identifying, selecting, dragging, or dropping. In any of the operations described herein that form part of the present invention, these operations are machine operations. Useful machines for performing the operations of the present invention include general purpose digital computers or other similar devices. In all cases, there should be borne in mind the distinction between the method of operations in operating a computer and the method of computation itself. The present invention relates, in part, to method steps for operating a computer in processing electrical or other physical signals or quantities to generate other desired physical signals or quantities.

The present invention also relates to an apparatus for performing these operations. This apparatus may be specially constructed for the required purposes, or it may be a general purpose computer selectively activated or reconfigured by a computer program stored in the computer. Although a particular computer may be selected for illustration purpose, the processes presented herein are not inherently related to any particular computer or other apparatus. In particular, various general purpose machines may be used with programs written in accordance with the teachings herein, or a more specialized apparatus may be used to perform the required method steps. The required structure for a variety of these machines will appear from the description given below.

Architecture and Operation of the Apparatus and Method

Figure 1:
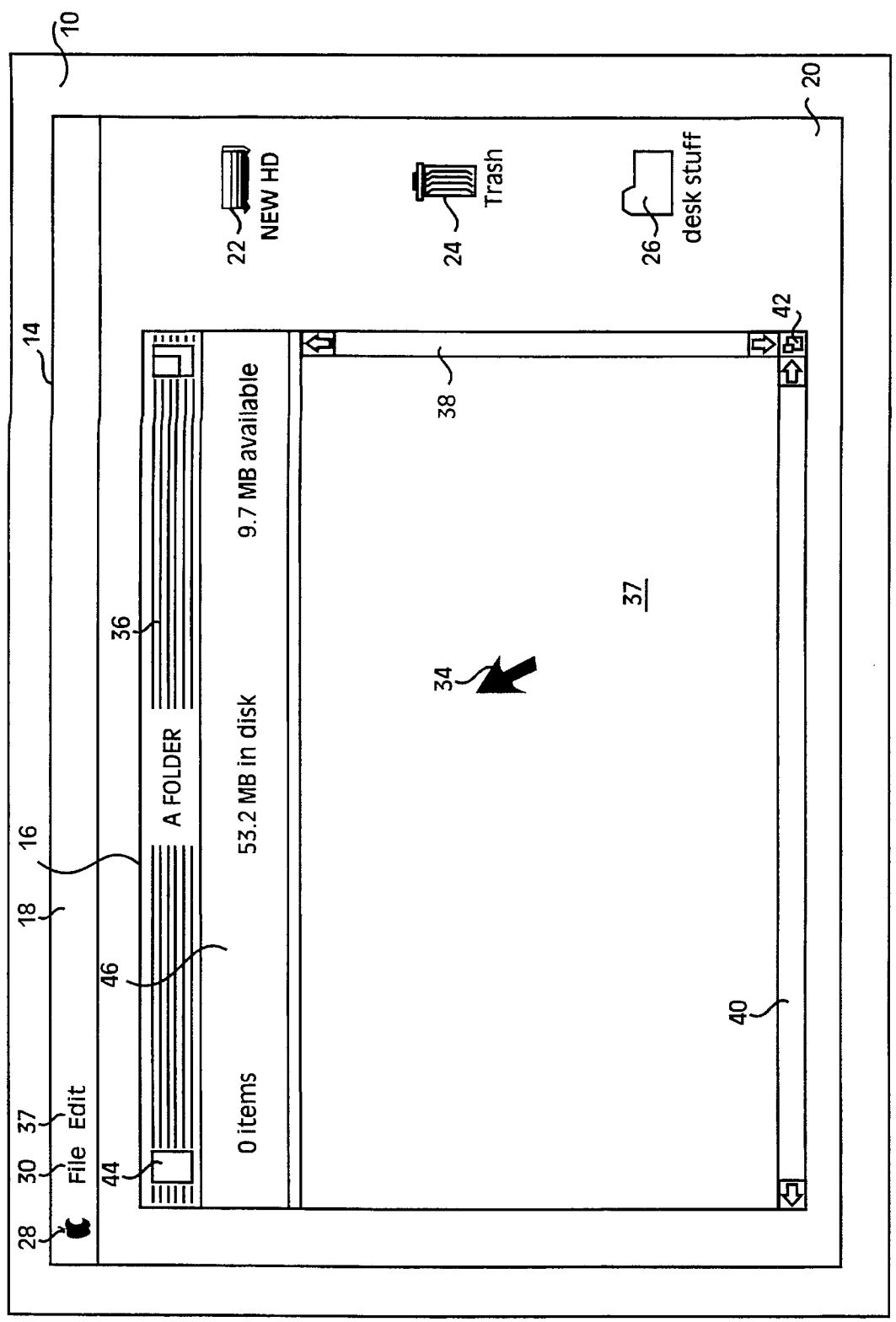
FIG. 1 shows in a simplified format a typical prior art GUI screen.
Figure 2:
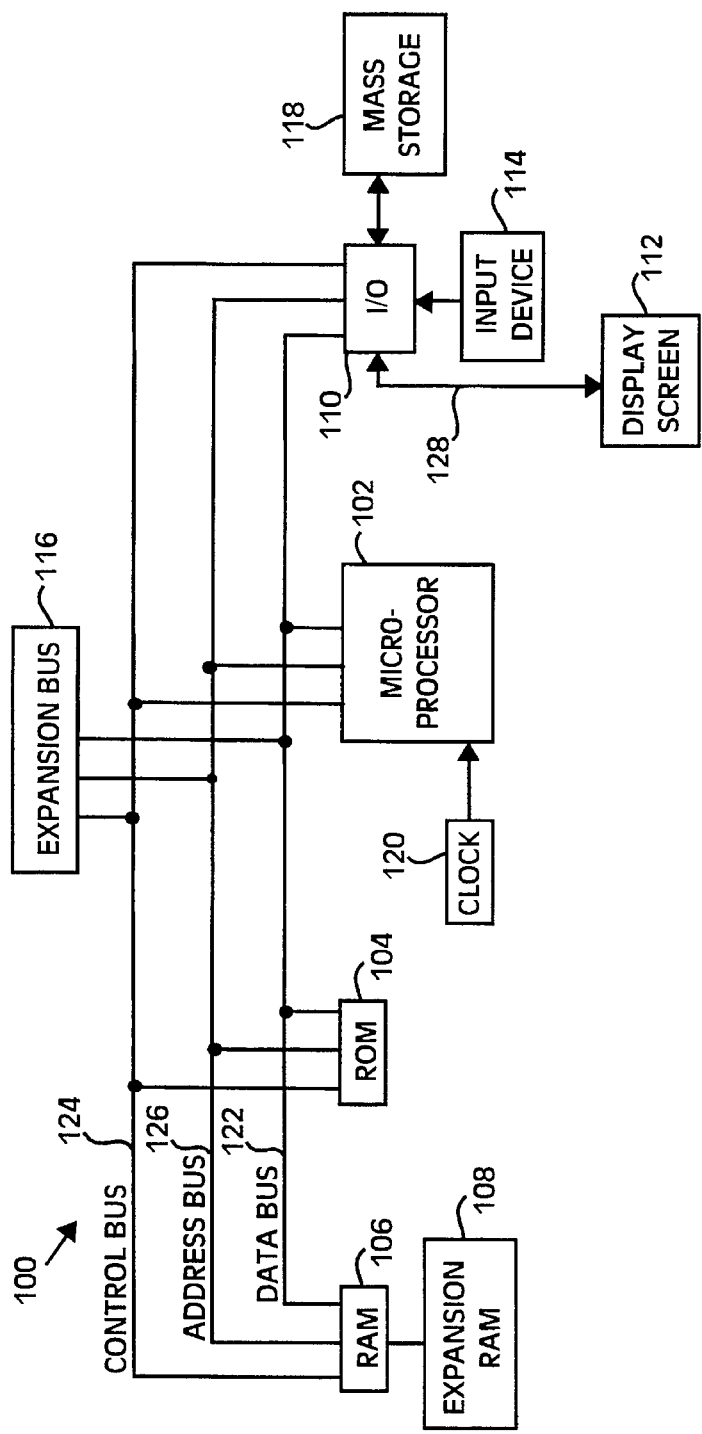
FIG. 2 shows in a simplified diagram a computer system for implementing the present invention.

FIG. 2 shows a general purpose computer system for implementing the present inventive method. Referring to FIG. 2, a computer system 100 in accordance with the present invention includes a central processing unit (CPU) 102, read only memory (ROM) 104, random access memory (RAM) 106, expansion RAM 108, input/output (I/O) circuitry 110, display assembly 112, input device 114, and expansion bus 116. Computer system 100 may also optionally include a mass storage unit 118 such as a disk drive unit or nonvolatile memory such as flash memory and a real-time clock 120.

CPU 102 is preferably a commercially available, single chip microprocessor such as one of the Intel X86 or Motorola 680XX family of chips, and is preferably a reduced instruction set computer (RISC) chip such as the PowerPC microprocessor available from Motorola, Inc. CPU 102 is coupled to ROM 104 by a data bus 122, control bus 124, and address bus 126. ROM 104 contains the basic operating system for the computer system 100. CPU 102 is also connected to RAM 106 by busses 122, 124, and 126 to permit the use of RAM 106 as scratch pad memory. Expansion RAM 108 is optionally coupled to RAM 106 for use by CPU 102. CPU 102 is also coupled to the I/O circuitry 110 by data bus 122, control bus 124, and address bus 126 to permit data transfers with peripheral devices.

I/O circuitry 110 typically includes a number of latches, registers and direct memory access (DMA) controllers. The purpose of I/O circuitry 110 is to provide an interface between CPU 102 and such peripheral devices as display assembly 112, input device 114, and mass storage 118.

Display assembly 112 of computer system 100 is an output device. In the case of certain computers, such as the Apple™ Newton™, display assembly 112 also serves as a part of the input device. When operating as an input device, a position-sensing apparatus disposed on the surface of display assembly 112 works in cooperation with input device 114 to receive data input from the user. Accordingly, it is coupled to I/O circuitry 112 by a data bus 128. When operating as an output device, the display assembly 112 receives data from I/O circuitry 110 via bus 128 and displays that data on a suitable screen. Note that unless display assembly 112 serves an input function, it is not absolutely necessary that data bus 128 be bi-directional.

The screen for display assembly 112 can be a device that uses a cathode-ray tube (CRT), liquid crystal display (LCD), or the like, of the types commercially available from a variety of manufacturers. Input device 114 can be a keyboard, a mouse, a stylus working in cooperation with a position-sensing display, or the like. Alternatively, input device can be an embedded RF digitizer activated by an "active" RF stylus. Therefore, as used herein, the term input device will refer to any mechanism or device for entering data and/or pointing to a particular location on a screen of a computer display. The aforementioned input devices are available from a variety of vendors and are well known in the art.

Some type of mass storage 118 is generally considered desirable. However, mass storage 118 can be eliminated by providing a sufficient amount of RAM 106 and expansion RAM 108 to store user application programs and data. In that case, RAMs 106 and 108 can optionally be provided with a backup battery to prevent the loss of data even when computer system 100 is turned off. However, it is generally desirable to have some type of long term mass storage 118 such as a commercially available hard disk drive, nonvolatile memory such as flash memory, battery backed RAM, PC-data cards, or the like.

In operation, information is inputted into the computer system 100 by typing on a keyboard, manipulating a mouse or trackball, or "writing" on a tablet or on position-sensing screen of display assembly 112. CPU 102 then processes the data under control of an operating system and an application program stored in ROM 104 and/or RAM 16. CPU 102 then typically produces data which is outputted to the display assembly 112 to produce appropriate images on its screen.

Expansion bus 116 is coupled to data bus 122, control bus 124, and address bus 126. Expansion bus 116 provides extra ports to couple devices such as modems, display switches, microphones, speakers, etc. to CPU 102.

Figure 3A:
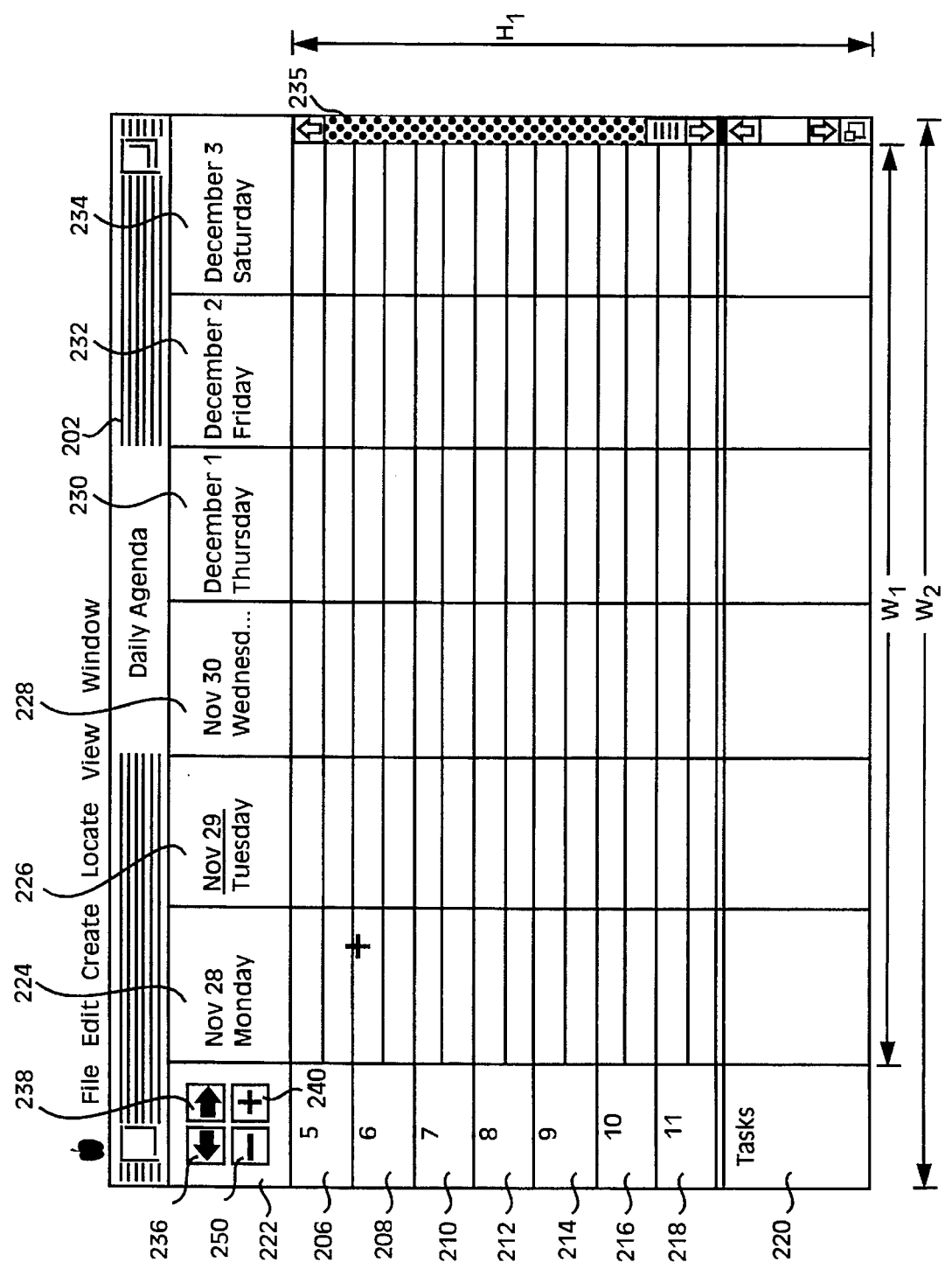
FIG. 3A shows in a simplified format an application program which displays information in a matrix format.

FIG. 3A shows in a simplified format an application program which displays information in a matrix format. For illustration purposes and without limiting the scope of the invention disclosed herein, the application program shown in FIG. 3A is arbitrarily chosen to be a personal information manager program, e.g. a type of program that displays, among others, a calendar and appointments thereon. Referring to FIG. 3A, shown is a window 202. Within window 202, there is shown a matrix display area having a width $W_1$ and a height $H_1$. Within matrix display area $W_1$ $H_1$, there are eight rows 206, 208, 210, 212, 214, 216, 218, and 220. Matrix display area $W_1$ $H_1$ also has, as shown in FIG. 3A, six columns, 224, 226, 228, 230, 232, and 234. Rows 206–220 and columns 224–234 form a eight-by-six matrix display area whose dimensions are, as mentioned earlier, $W_1$ $H_1$.

In the personal information manager application program shown in FIG. 3A, column 222 serves as a buffer column and is used to display the hours of a day. Row 204 serves as a buffer row and is used for displaying the header information regarding the days of the week. Row 220 is reserved for the user to make notations regarding the tasks to be done in a particular day of interest. At the intersection of each row and column is a matrix cell for entering, displaying, and manipulating information. For example, at the intersection of row 206 and column 224, there is shown a cell designated cell (206, 224) wherein information may be entered regarding the user's appointment at 5:00 PM on Monday, November the 28th.

A buffer column represents a column whose width is not proportionally adjusted responsive to an increase or decrease in the number of rows or columns displayed in the matrix display area. In some applications, buffer columns may advantageously be utilized to show row heading information, e.g. column 222 of FIG. 3A.

FIG. 3A also shows two scroll arrows: a left scroll arrow 236 and a right scroll arrow 238. When left scroll arrow 236 is selected, e.g. by clicking on arrow button 236, the calendar shown in FIG. 3A is scrolled backward to show an earlier calendar period, e.g. from Sunday, November 27 to Friday, December 2nd. When right scroll arrow 238 is selected, e.g. by clicking on arrow button 238, the calendar shown in FIG. 3A scrolls forward, displaying a more future calendar period, e.g. to Sunday December 4th.

There is also shown in FIG. 3A two activators: an increase activator 240 and a decrease activator 250. In the example of FIG. 3A, increase activator 240 is used to add an additional column of matrix cells to the existing matrix. On the other hand, decrease activator 250 is used to remove a column of matrix cells from the existing matrix. When a column is added, by selecting increase activator 240, the newly added column of matrix cells is preferably placed to the right of the existing columns. Conversely, when a column of matrix cells is removed from the display matrix, e.g. by selecting decrease activator 250, the right-most column of matrix cells is preferably removed.

Figure 3B:
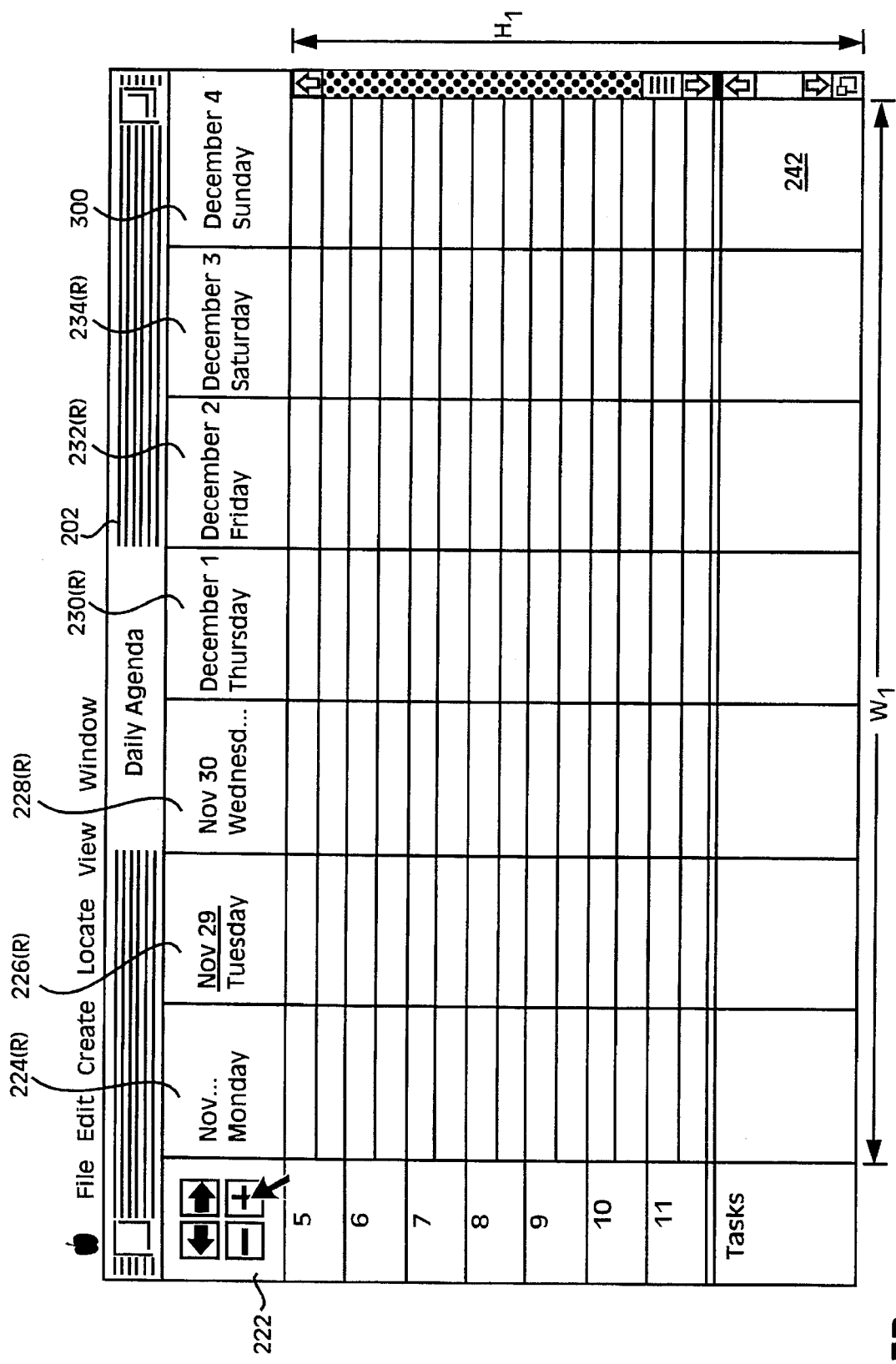
FIG. 3B shows in a simplified format the window of FIG. 3A, including an additional column.

FIG. 3B shows in a simplified format window 202 of FIG. 3A, including an additional column 300. Note that the matrix display area of FIG. 3B has the same dimension of the matrix display area of FIG. 3A: $W_1 H_1$. Also shown in FIG. 3B are seven columns 222, 224(R), 226(R), 228(R), 230(R), 232(R), and 234(R). Column 222 of FIG. 3B has substantially the same width as column 222 of FIG. 3A since column 222 is a buffer column whose width is not proportionally adjusted responsive to an increase or decrease in the number of rows or columns displayed in the matrix display area. In one embodiment, however, column 222 may be used as a flexible storage column, which may flexibly be expanded to close up any gaps between the columns and the boundaries of a window. Gaps between the columns and the boundaries of a window may exist when, for example, the columns do not fit neatly into the space available within the matrix display area. The amount by which a flexible storage column is expanded is kept track of. As will be seen later, when it is time to adjust the matrix again, that amount is taken into account as part of the matrix display area for the purpose of determining the size of the matrix display area. In contrast to column 222, each of columns 224–234 of FIG. 3A are proportionally reduced in width to accommodate additional column 300. For example, column 224 of FIG. 3A is reduced in width, resulting in column 224(R) of FIG. 3B.

Figure 3C:
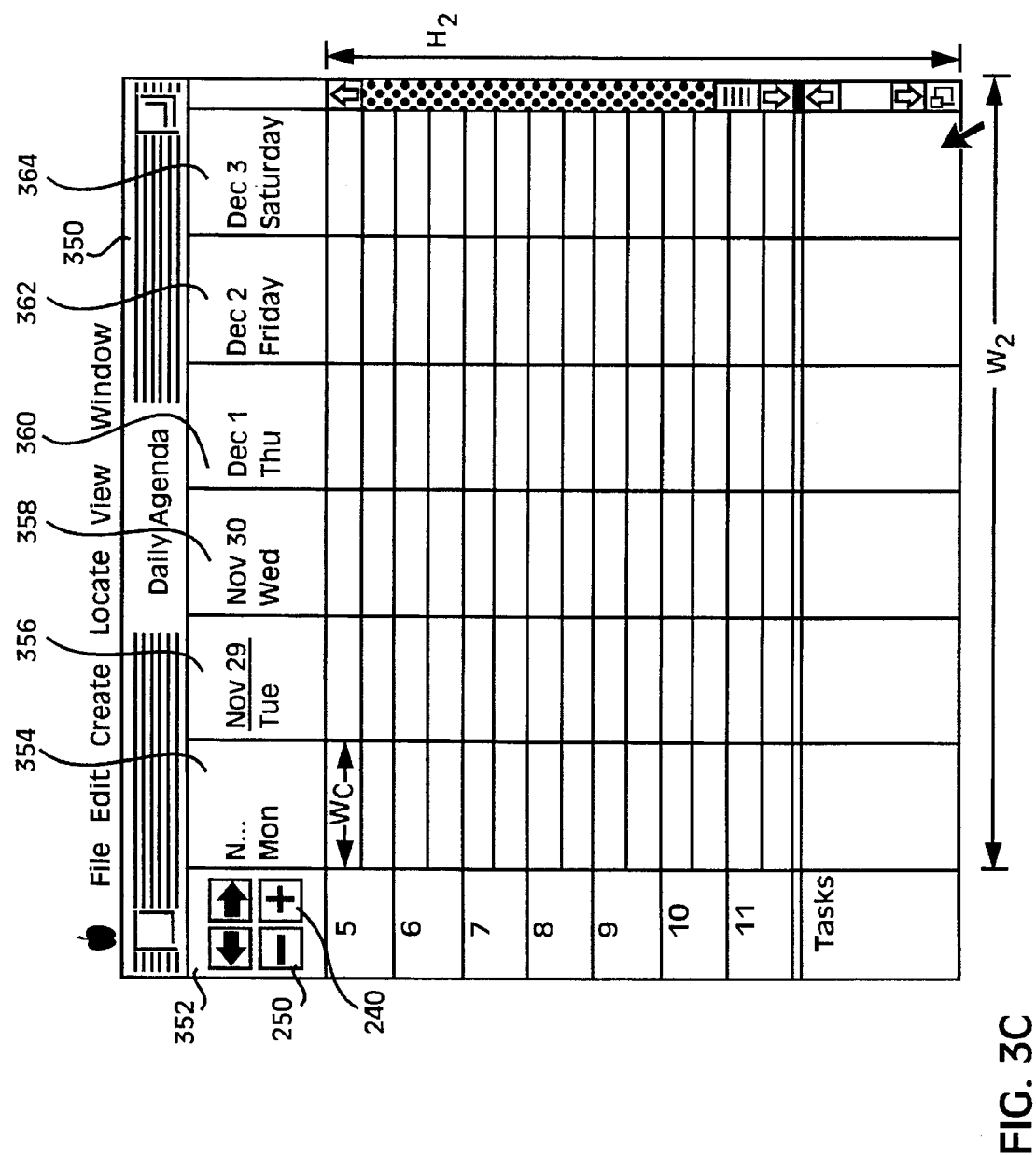
FIGS. 3C and 3D show a window that is increased in width to accommodate the addition of an additional column of matrix cells.
Figure 3D:
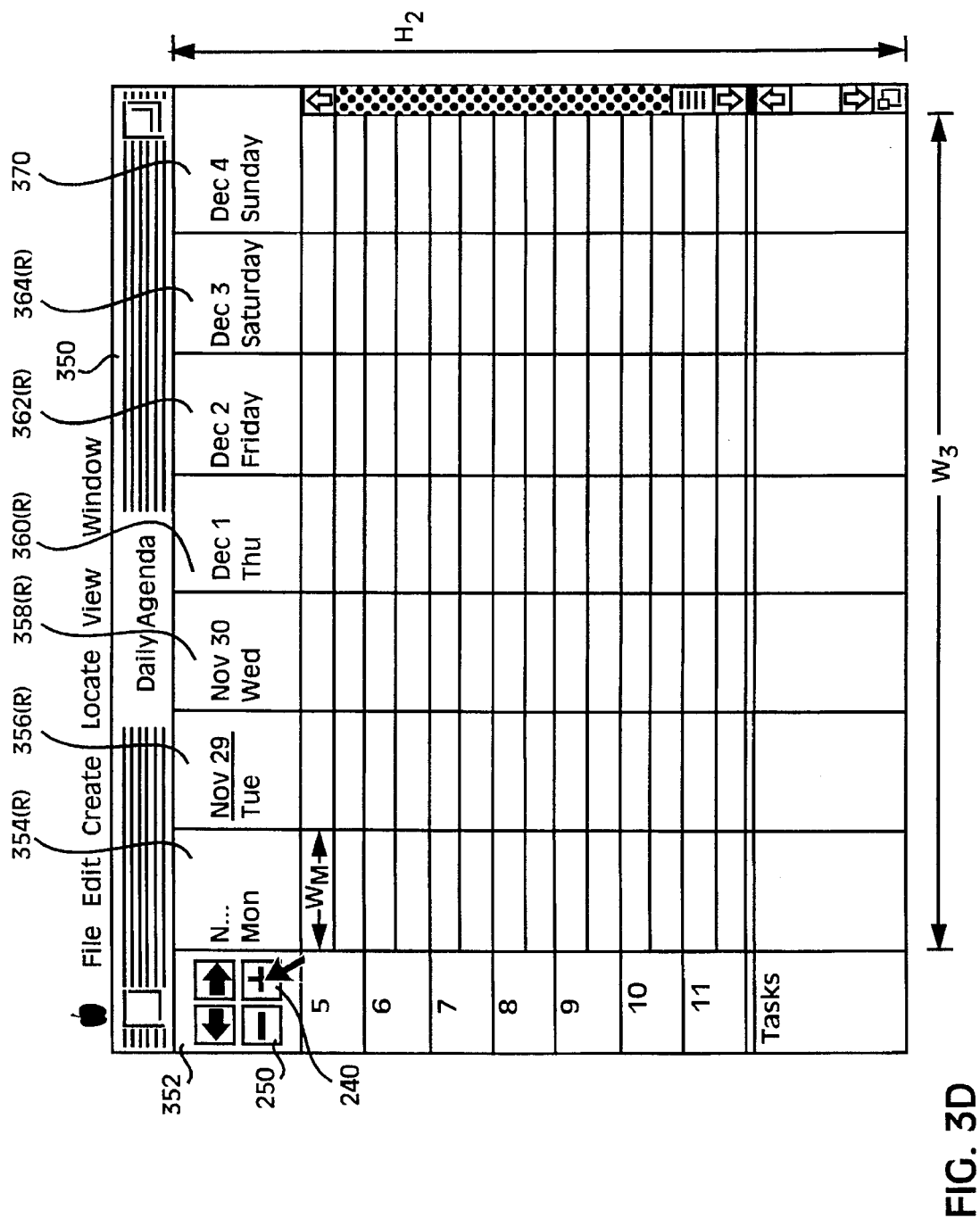

FIGS. 3C and 3D show a window 350 that is increased in width to accommodate the addition of an additional column of matrix cells. FIG. 3C shows in a simplified format window 350, including a matrix display area having a dimension of $W_2 H_2$. Referring to FIG. 3C, there are shown a plurality of columns, including columns 352, 354, 356, 358, 360, 362, and 364 in display window 350. Also shown are increase activator 240 and decrease activator 250 for adding or removing columns of matrix cells in the manner previously discussed. Column 352 is designated a buffer column, i.e. its width does not proportionally change responsive to an increase or decrease in the number of columns in window 350. Each of columns 354–364 has a width $W_c$ that, for the purpose of illustrating the present invention, is at or only slightly larger than a predefined minimum column width $W_M$. Predefined minimum column width $W_M$ may be predefined by the user or the software. Typically, predefined minimum column width $W_M$ is set to correspond to a predefined minimum critical area. The minimum critical area is a value preset either by the user or by the software, and represents the minimum area of a cell that can be displayed. It is often advantageous to display only the minimum critical areas of the cells instead of the entire cell areas because a user may wish to display a maximum number of cells in a display matrix in certain view modes.

FIG. 3D shows the window 350 of FIG. 3C after increase activator 240 has been selected once to add an additional column to the display matrix in the matrix display area of window 350. A new column 370, representing Sunday December 4, is added to the calendar window shown in FIG. 3D. Column 352 of FIG. 3D has substantially the same width as column 352 of FIG. 3C. However, each of columns 354(R), 356(R), 358(R), 360(R), 362(R), and 364(R) as well as column 370 has a column width $W_M$, representing the minimum column width value that is preset by the user. In contrast to the situation of FIG. 3B in which the matrix display area retains it original dimension after an additional column is added, the matrix display area of window 350 of FIG. 3D is increased in width, to $W_3$, in order to accommodate additional column 370. The increase in the width of the matrix display area and consequently of window 350 is necessary because each of columns 354–364 of FIG. 3C cannot be further decreased in width to accommodate an additional column within the original matrix display area dimension $W_2 H_2$ without falling below the predefined minimum column width $W_M$.

Figure 4:
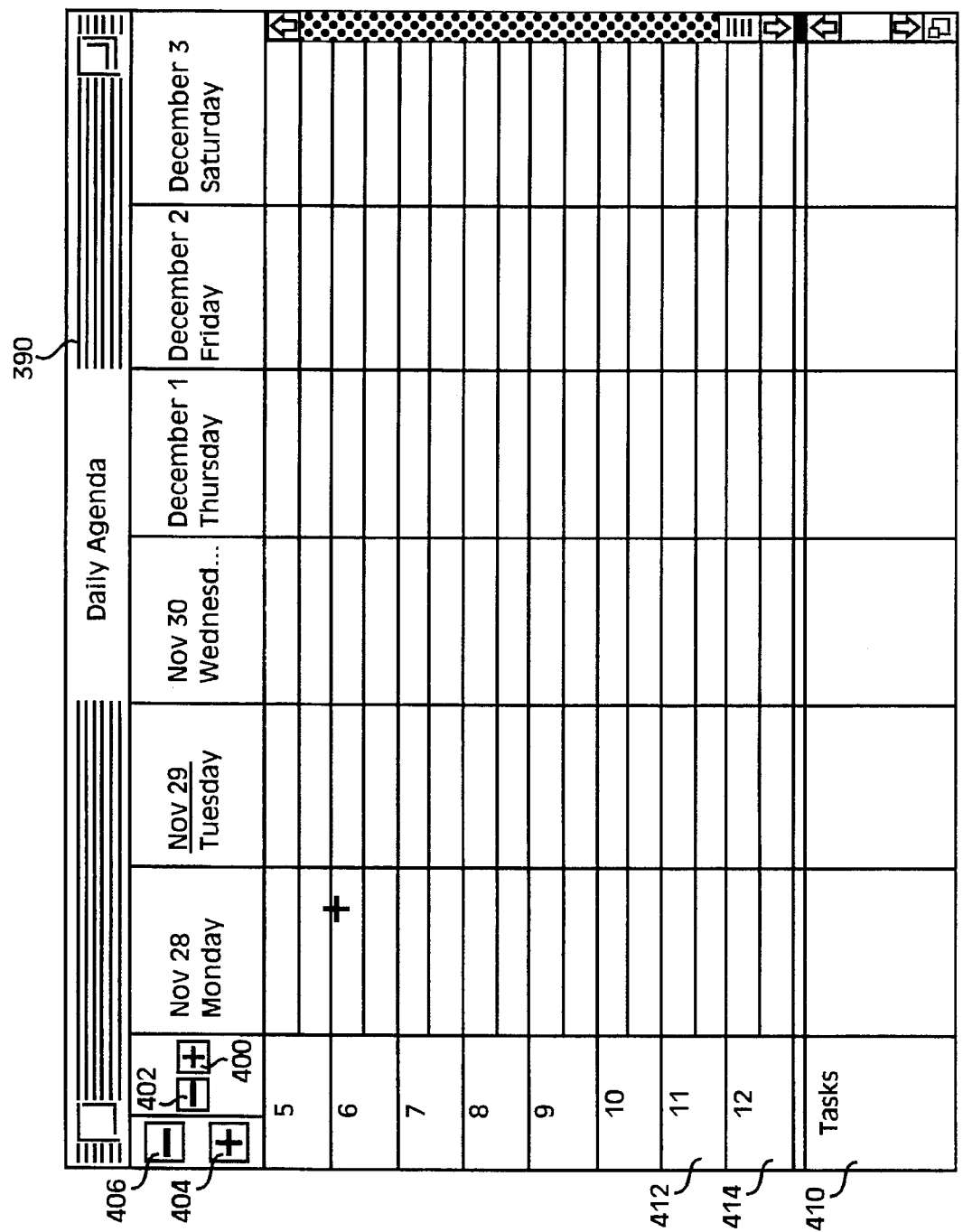
FIG. 4 shows an alternate embodiment including a window having activators for both columns and rows.

FIG. 4 shows an alternate embodiment, including a window 390 having activators for both columns and rows. In FIG. 4, shown are column increase activator 400 and column decrease activator 402. Column increase activator 400 is used for increasing the number of columns of matrix cells displayed while column decrease activator 402 is used for removing a column of matrix cells from window 390. Row increase activator 404 is used to add an additional row of matrix cells to the matrix display area of window 390 while row decrease activator 406 is used for removing a row of matrix cells from window 390. There is also shown in FIG. 4 a constant height row 410 used to note the tasks to be performed in each day of the week. When row increase activator 404 is selected, a row is preferably added at the bottom of the matrix display area before row 410. For example, if row 412 was the last row before the selection of row increase activator 404, newly added row 414 would be inserted between row 412 of the matrix display area and row 410. Conversely, if row decrease activator 406 is selected, the steps mentioned previously are reversed, and row 414 is preferably removed from the matrix display area of application program 390. In this case, row 410 simply moves up to close the gap left by removed row 414. Alternatively, the newly added row may simply be added at the bottom of the matrix display area, e.g. immediately below row 410. In this case, when row decrease activator 406 is selected, the bottom-most row is simply removed from the matrix display area of window 390.

In the example of FIG. 4, the user further has the option of specifying both the minimum column width and the minimum row width. When a row is added, e.g. by selecting row increase activator 404, window 390 preferably keeps the same dimension unless by shrinking the height of existing rows to accommodate a new row in the original dimension of the matrix display area, the width of any of the rows shrinks below the predefined minimum row height. In that case, window 390 is preferably enlarged so that each row at least has a height that equals or exceeds the predefined minimum row height.

Figure 5:
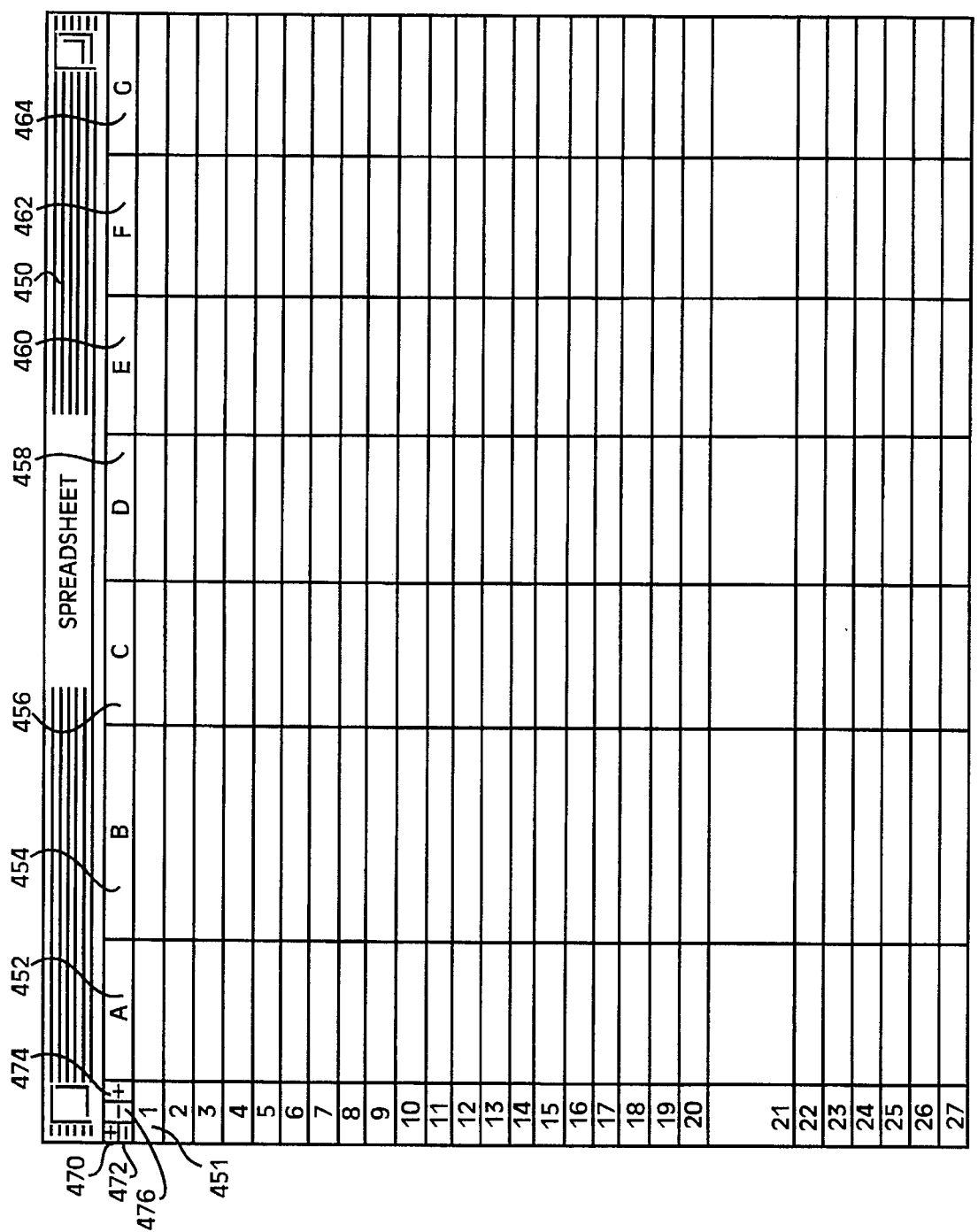
FIG. 5 shows a window implementing the present invention in a spreadsheet program.

FIG. 5 shows a window 450 for implementing the present invention in a spreadsheet program. As is well known, spreadsheet programs are popular for performing calculations, making business forecasts, and organizing data. Spreadsheet window 450 includes a plurality of columns 451, 452, 454, 456, 458, 460, 462, and 464. Column 451 is preferably a buffer column for listing the row numbers of spreadsheet 450. Each of columns 452–464 has a minimum width that is predefined by the user or by the data contained in the cell at the intersection of a row and a column.

As is known, columns of a spreadsheet, such as the spreadsheet of FIG. 5, typically have the same width although such is not a requirement. In one embodiment, when it is desirable to keep all columns proportional in width, i.e. having the same width relative to one another, the width of each column is adjusted proportionally within the window when a new column is added to the window so that all columns in a window maintain their relative width to each other after the addition.

As mentioned earlier, it is however not necessary that the columns of the spreadsheet window of FIG. 5 have the same width. In fact, FIG. 5 shows a column 454 having a wider width than a column 452. In the same manner, it is not necessary for the rows of spreadsheet 450 to have the same height. For example, a row 21 is shown to have a greater height than a row 20 of spreadsheet 450. Regardless of the height of a row or the width of a column, it is preferable that there be specified a minimum column width for the columns of spreadsheet 450. Similarly, it is preferable that there be specified a minimum row height for the columns of spreadsheet 450.

FIG. 5 also shows a row increase activator 470 and a row decrease activator 472 for respectively adding a row to and removing a row from spreadsheet 450. In the example of FIG. 5, it is preferable that a row is added or removed from the bottom of the spreadsheet. There is also shown in FIG. 5 a column increase activator 474 and a column decrease activator 476 for respectively adding a column to and removing a column from a spreadsheet 450 of FIG. 5. It is preferable that when column increase activator 474 is selected, a column is added to the right of spreadsheet 450, e.g. to the right of column 464 of FIG. 5. Similarly, it is preferable that when column decreased activator 476 is selected, the right-most column of spreadsheet 450 is removed, e.g. column 464 of FIG. 5.

Figure 6:
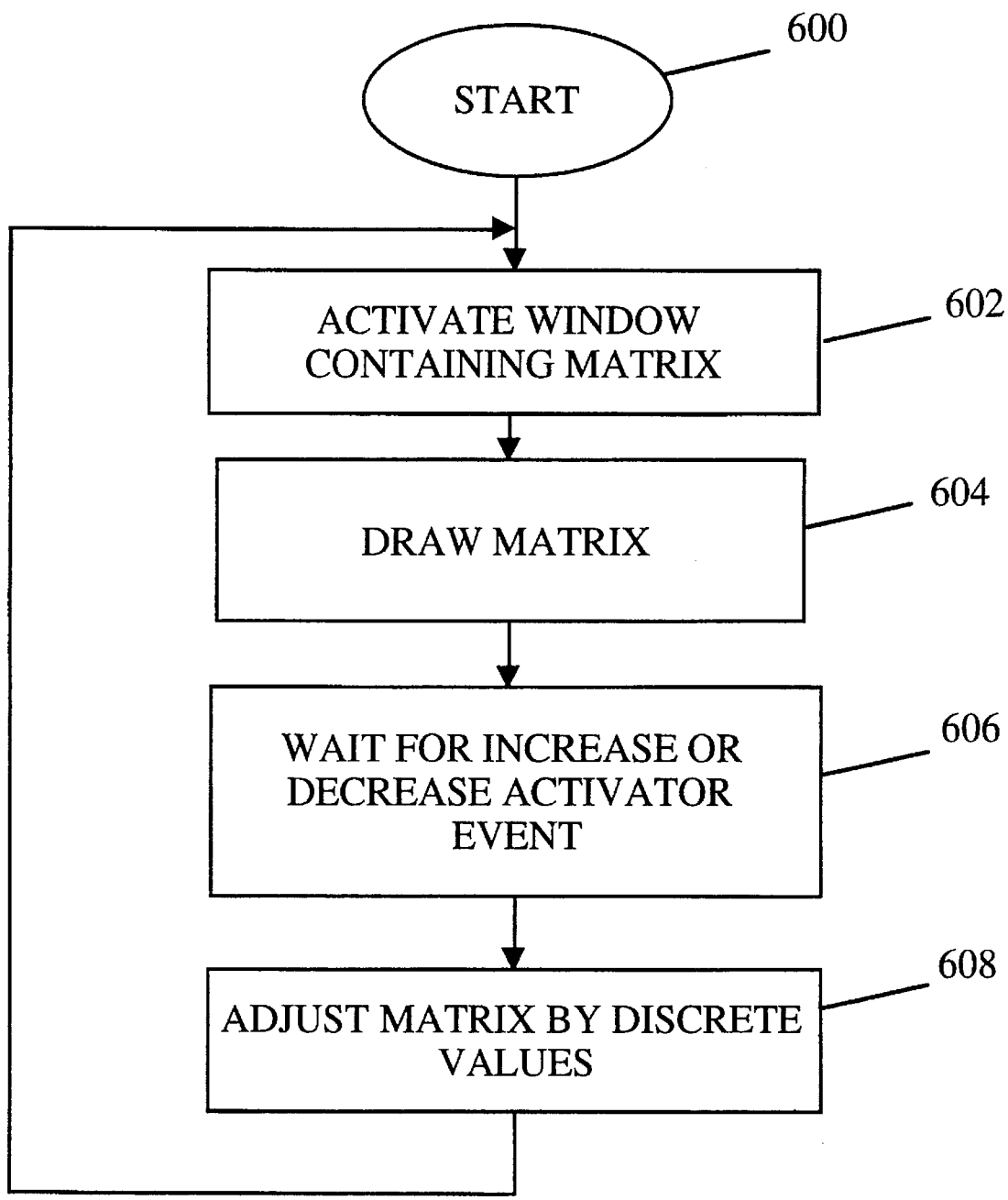
FIG. 6 shows in a simplified flowchart format the steps involved in modifying a display matrix in accordance with one aspect of the present invention.

FIG. 6 shows in a simplified flowchart format the steps involved in modifying a display matrix in accordance with one aspect of the present invention. FIG. 6 starts at step 600. From step 600, the method proceeds to step 602 to activate a window containing a matrix. As the term is used herein, a window may be either a GUI window which may occupy only a portion of a computer display screen, or a window in a non-GUI application that typically occupies the entire display screen. The window that is activated in step 602 may implement a personal information manager program, such as those shown in FIGS. 3A–D and 4, a spreadsheet program such as that shown in FIG. 5, or a word processor program that displays and manipulates text in a column/newspaper format. The activation in step 202 may be performed by executing, e.g. "running", the underlying application program as is well known.

A window containing a matrix may be activated by double clicking on an icon that represents the underlying application program. This method of activating an application program by double clicking on an icon is well known to users of GUI interfaces. However, the window containing a matrix may have been inactive, e.g. the window is in the background and not currently active, and step 602 may merely involve the selection of that window. As is well known to most users of GUIs, including Macintosh users, activating an existing window that is currently inactive typically involves selecting, e.g. clicking once with the screen pointer device, e.g. a mouse, on an unobstructed area of the inactive window.

From step 602, the method proceeds to step 604 to draw a matrix. After the matrix is drawn in step 604, the method proceeds to step 606 to wait for an increase or a decrease activator event. In step 606, an activator event occurs when either an increase or a decrease activator is selected. The increase or decrease activators themselves may be implemented by increase and decrease buttons respectively. Alternatively, increase and decrease activators may be implemented as menu bar items or placed under cursor keys control. Depending on the specific application, an increase activator may be used to add a column or a row or both to a display matrix. Similarly, a decrease activator may be used to remove a column or a row or both from a display matrix.

In the preferred embodiment, every time the increase activator is selected, a row or a column is added to the display matrix. However, it is possible to specify that each time an increase activator event is detected, two rows or columns should be added to the display matrix. Similarly, when a decrease activator event is detected, the preferred embodiment removes a row or a column from the existing display matrix. Likewise, it is possible to specify that for each decrease activator event detected, two or more rows or columns may be removed at once from the existing display matrix.

From step 606, the method proceeds to step 608 when either an increase or a decrease activator event is detected to adjust the display matrix by a discrete amount. From step 608, the method proceeds to step 610, representing the end of the steps of FIG. 6.

In contrast to prior art methods, step 608 adjusts the display matrix by adding or removing an entire row or column of matrix cells, regardless whether the dimensions of the window is changed thereby. For example, when column 300 of FIG. 3B is added to window 202 of FIG. 3A, the matrix display area of window 202 retains it original dimension $W_1$ $H_1$ as seen in FIG. 3B. In this case, it is possible to resize the existing columns, e.g. columns 222–234 of FIG. 3A to accommodate additional column 300 within the original dimension $W_1$ H1 without violating the predefined minimum column width. On the other hand, when column 370 of FIG. 3D is added to window 350 of FIG. 3C, it is not possible to further reduce the column width of the existing columns in FIG. 3C without violating the predefined minimum column width. In such case, the method expands the width of the matrix display area in window 350, i.e. from $W_2$ to $W_3$, in order to add the additional column 370 without having to reduce the width of existing columns 352–364 to a value that is below the predefined minimum column width.

Figure 7:
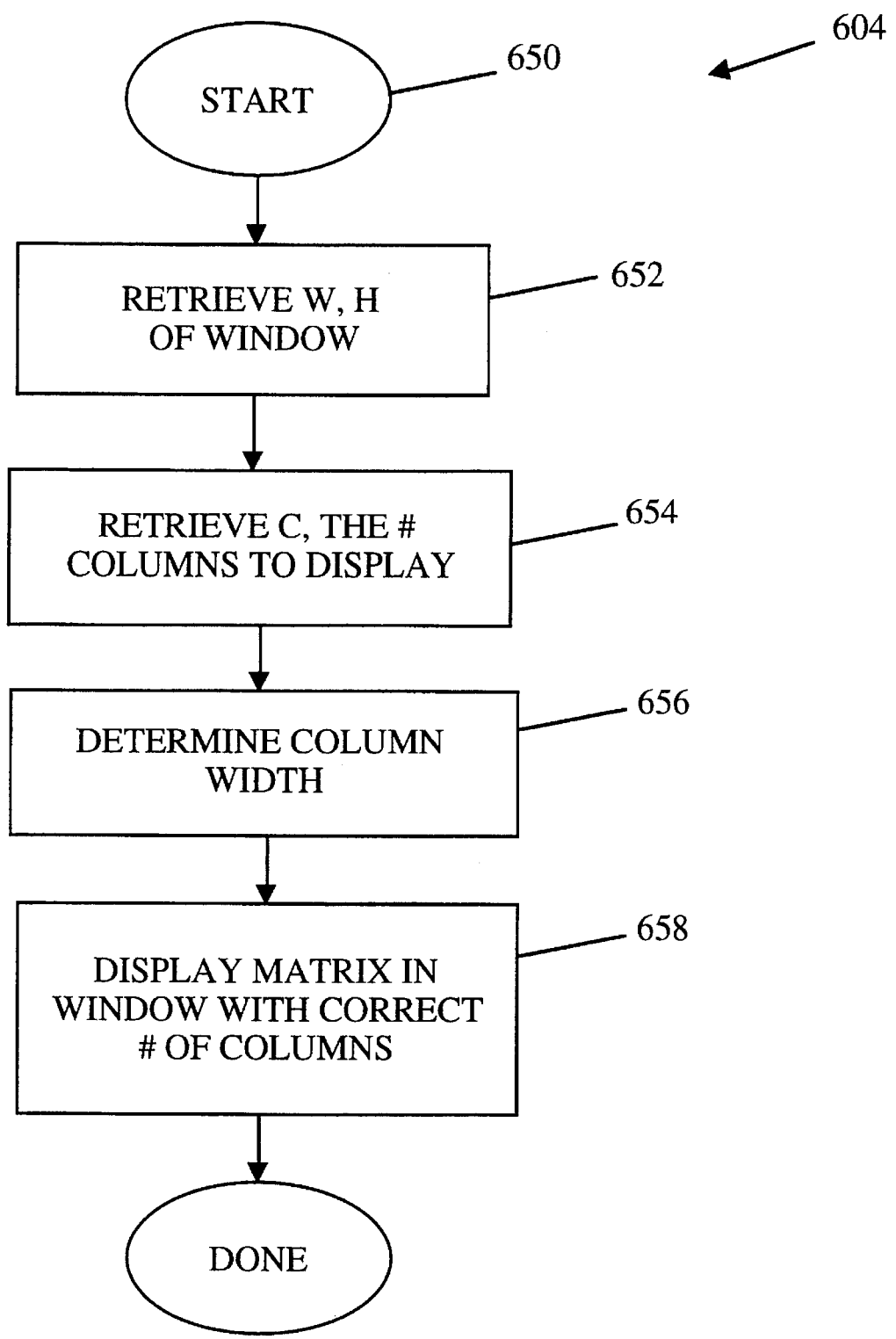
FIG. 7 shows in greater detail the draw matrix step 604 of FIG. 6.

FIG. 7 shows in greater detail the draw matrix step 604 of FIG. 6. FIG. 7 starts at step 650. From step 650, the method proceeds to step 652 to retrieve values for the width and height of the display window to be displayed. In a non-GUI application, the width and height of the window is preferably the size of the entire computer display screen. In a GUI interface environment, the width and height of a window may be predefined to be less than the dimension of the entire computer display screen.

For illustration purposes, ease of reference, and without limiting the scope of the invention disclosed herein, the preferred embodiment is arbitrarily chosen to be a calendar program showing seven columns for the seven days of the week as well rows showing the specific hours of the day. Further, it is arbitrarily chosen for ease of illustration that the increase and decrease activators of the preferred embodiment be implemented as increase and decrease buttons.

When the increase activator of the preferred embodiment is selected, an additional column representing one more day is added to the right hand side of the existing columns. Conversely, when the decrease activator of the preferred embodiment is selected, a column, representing one day of the week, is removed from the fight of the display matrix. The adaptation of the preferred embodiment disclosed herein to add or remove rows or to adjust the display matrix in other types of programs, e.g. a spreadsheet or word processor, is within the abilities of one skilled in the art given this disclosure.

From step 652, the method proceeds to step 654 to retrieve the number of columns to be displayed in matrix display area of the window. If this is the first time that a matrix is displayed in the window, the value C, representing the number of columns to be displayed in matrix display area of the window, is preferably predefined such that when C columns of matrix cells are displayed in the matrix display area of the window whose dimensions are specified in step 652, the width of each column does not fall below a predefined minimum column width $W_M$. In other words, if the window is activated for the first time to show a display matrix, the parameters specified in steps 652 and 654 should be legal.

From step 654, the method proceeds to step 656 to determine the column width. After the column width is determined in step 656, the matrix is displayed in the matrix display area of the window with the correct number of columns in step 658. From step 658, the method proceeds to step 660 representing the end of the steps of FIG. 7.

Figure 8:
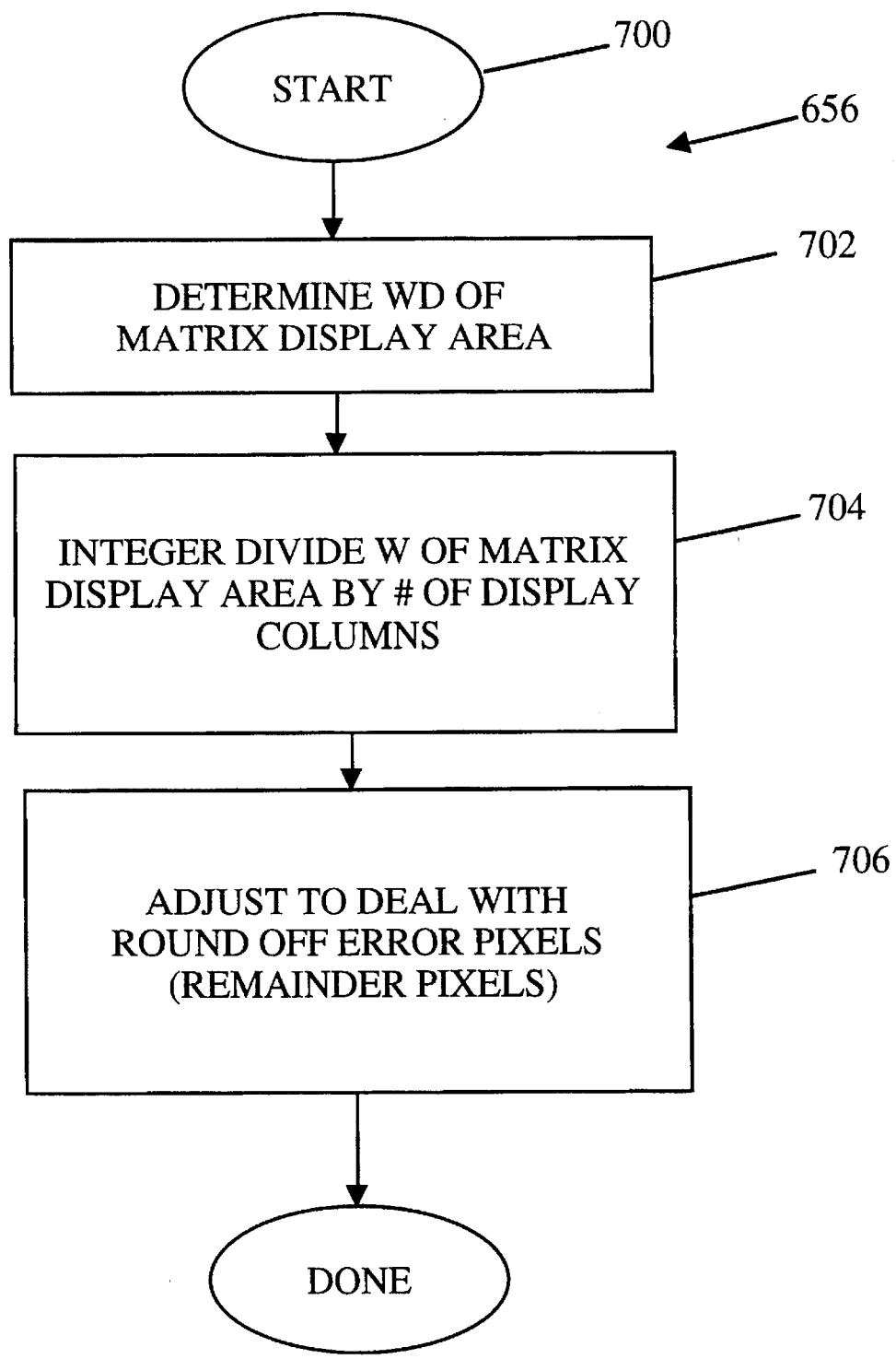
FIG. 8 shows in greater detail the determine column width step 656 of FIG. 7.

FIG. 8 shows in greater detail the determine column width step 656 of FIG. 7. FIG. 8 starts at step 700. From step 700, the method proceeds to step 702 to determine the width of the matrix display area $W_D$. The width of the matrix display area is different from and is typically less than the width of the window specified in step 652. For example, width $W_1$ of the matrix display area of FIG. 3A is less than width W of window 202 by a value that equals the width of buffer column 222, scroll bar 235, as well as any margins. It should be noted that in a non-GUI window, the width of the matrix display area is typically, except for the presence of any margins or buffer columns, the same size as the width of the computer display screen.

From step 702, the method proceeds to step 704 to integer divide $W_D$, representing the width of the matrix display area, by C, which represents the number of display columns. Integer division is performed in step 704 because the preferred embodiment represents an application program implementing a display matrix in which all columns have a fixed, similar width. In step 704, the division is performed in an integer manner without taking into account any remainder. If there are any remainder pixels as a result of the integer divide operation of step 704, the method proceeds to step 706 to adjust the window to deal with remainder pixels.

If there are remaining pixels, it is preferable that the remainder pixels be added to the buffer column, e.g. buffer column 222 of FIG. 3A, so that all columns in the main matrix display area, e.g. columns 224–234 of FIG. 3A, have the same column width. In this case, the buffer column is temporarily expanded to fill in the gap that would have been left in the matrix display area because of the integer divide operation in step 704. The number of remainder or leftover pixels that are added to the buffer column is kept tracked of and accounted for as part of the matrix display area if the matrix display area is adjusted in the next round due to an addition or a removal of a column of matrix cells.

Alternatively, it is possible to resize the window by reducing the width of the window by the number of remainder pixels, derived as a result of the integer division in step 704, so that the columns properly fit inside the window boundaries. As a further alternative, it is possible to distribute the pixels in a nonarbitrary way among the colunms so that certain columns have a greater width than other columns.

It should be noted that the steps of FIG. 8 are performed only if the application program displays a display matrix whose columns have a fixed, similar width. In certain applications, e.g. certain spreadsheet programs, the column width may be variable. In other words, each column, due to a user's setting or the definition of the data contained within its cells, may have a width that is different from the width of other columns. In a generalized system where the column width may be variable, the column width of each column is retrieved one by one and displayed in steps 656 and 658 of FIG. 7.

Figure 9:
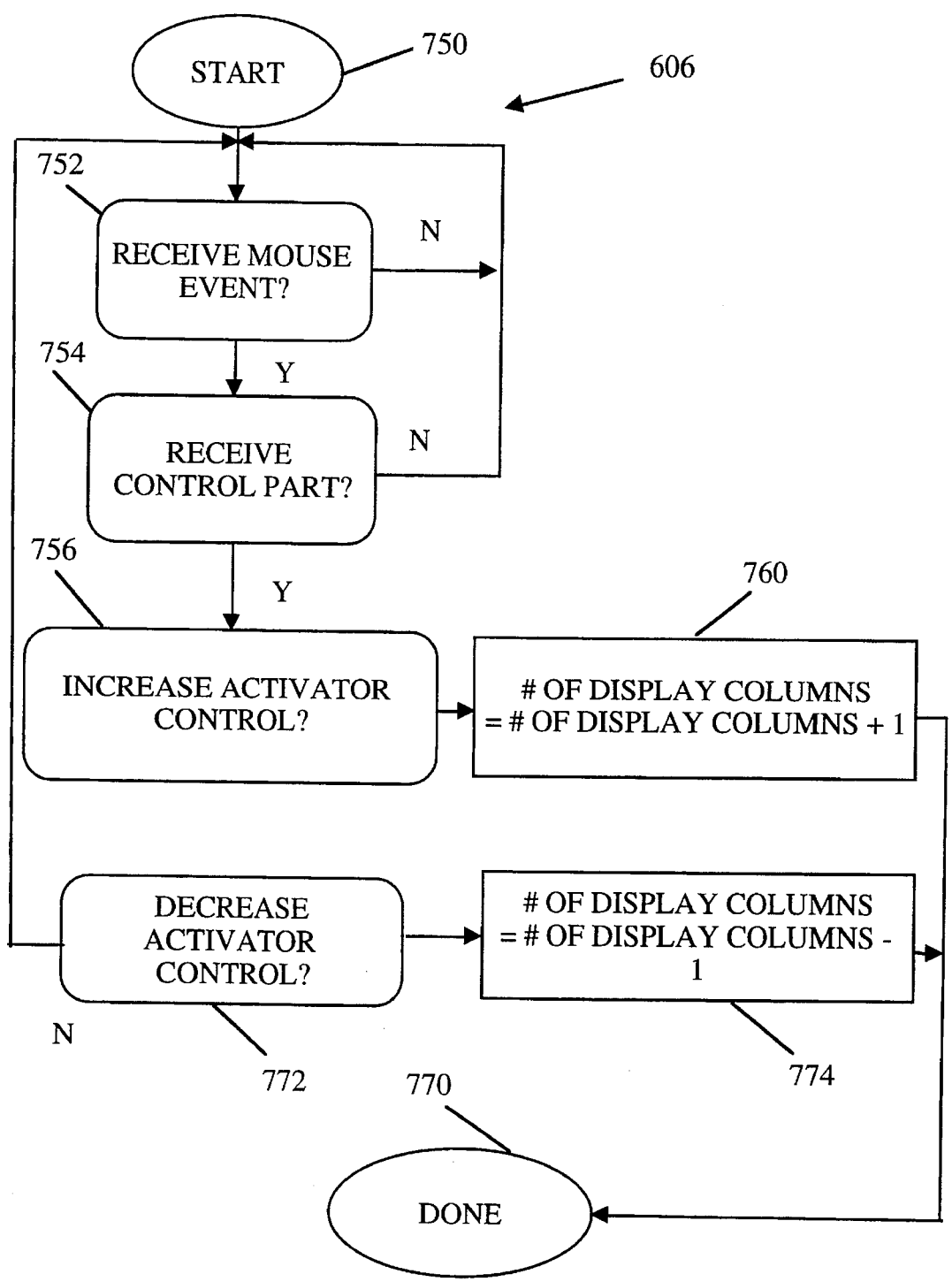
FIG. 9 shows, in one embodiment, an implementation of step 606 of FIG. 6 that is specific to the Apple Macintosh and Power PC computers.

FIG. 9 shows, in one embodiment, an implementation of step 606 of FIG. 6 that is specific to the Apple Macintosh and Power PC computers. FIG. 9 starts at step 750. For further information regarding the above mentioned computers as they pertain to the steps of FIG. 9, reference should be made to the publication entitled *Inside Macintosh: Macintosh Toolbox Essentials* by Apple Computer Inc. (Addison Wesley, 1992), incorporated herein by reference for all purposes. From step 750, the method proceeds to step 752 where it checks whether a mouse event has been received. If a mouse event is not received (as determined in step 752), the method loops back to step 752 to wait for another mouse event. On the other hand, if a mouse event is received (as determined in step 752), the method proceeds to step 754 to receive the window part that is associated with the mouse event received in step 752. In step 754, the method ascertains, e.g. by inquiring the toolbox, the part of the window in which the mouse event occurred. If the part of the window in which the mouse event occurred is not a control part (as determined in step 754), the method returns to step 752 to wait for another mouse event.

On the other hand, if the part of the window in which the mouse event occurred is a control part (as determined in step 754), the method proceeds to step 756 where the control part ascertained in step 754 is tested to see whether it is an increase activator control part. If the control part is ascertained in step 756 to be an increase activator control part, the method proceeds to step 760 to update the number of display columns (DisplayCol) by adding one to the existing number of display columns if appropriate. From step 760, the method proceeds to step 770 where the steps of FIG. 9 ends.

On the other hand, if the control part received in step 754 is not an increase activator control part (as determined in step 756), the method proceeds to step 772 to check whether the control part received in step 756 is a decrease activator control part. If the control part received in step 756 is a decrease activator control part (as determined in step 772), the method proceeds to step 774 to update the number of display columns, DisplayCol, by subtracting one from the existing number of display columns if appropriate. From step 774, the method proceeds to step 770 to end the steps of FIG. 9.

On the other hand, if the control part ascertained in step 756 is not a decrease activator control part (as determined in step 772), the method returns to step 752 to wait for another mouse event.

In one embodiment, when a new column of matrix cells is added to the display matrix, the method keeps the column width of each existing column unchanged and increases the width of the window by an amount that equals the width of the newly added column of matrix cells unless in so doing, the resized window exceeds the preset window maximum size, which may in some cases be the entire display screen. The newly added column of matrix cells is then inserted into the space created by the enlarged window.

In another embodiment, the width of the window is kept unchanged and the width of each existing column is proportionally decreased in order to make room for the newly added column of matrix cells when a new column of matrix cells is added to the display matrix. This embodiment is suitable for use in spreadsheet programs although other embodiments may be utilized in spreadsheet programs without departing from the scope and spirit of the invention.

In the third, and preferred, embodiment, a combination of the aforementioned two embodiments is advantageously utilized. It is preferable that the width of the window is kept unchanged unless by decreasing proportionally the width of all existing columns, the width of any one column after adjustment falls below a predefined minimum column width value $W_M$. If the reduction in the width of existing columns results in any one column having a width less than a predefined minimum column width value $W_M$, the method first shrinks the width of all existing columns to the predefined minimum column width $W_M$. The method then expands the width of the window as necessary to accommodate the newly added column of matrix cells.

In the preferred embodiment, the width of the window after adjustment is the greater of either the width of the existing window or a value representing (DisplayCol * $W_M$+ the width of any margin, scroll bars, and buffer columns). DisplayCol represents the number of display columns in the display matrix after adjustment, $W_M$ represents the predefined minimum column width value. As can be appreciated from the foregoing, the product (DisplayCol * $W_M$) represents the width of the matrix display area within the window. The width of any margin, scroll bars, and buffer columns includes the width of any scroll bars such as scroll bar 38, buffer columns such as buffer column 222, and any other columns that stay relatively unchanged in width regardless of the number of display columns in the display matrix.

Figure 10:
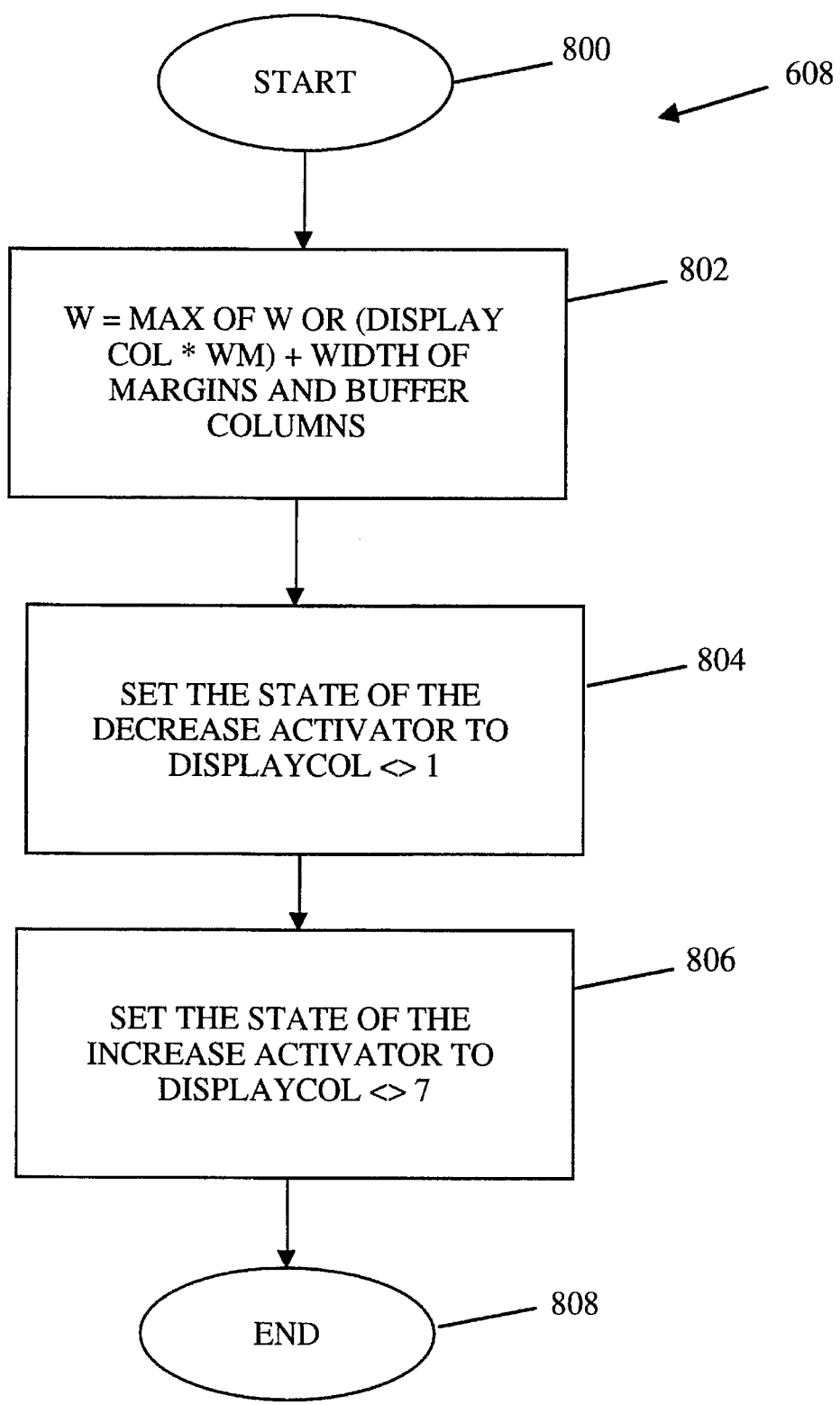
FIG. 10 shows in a simplified flowchart format the adjust display matrix by discrete values step 608 of FIG. 6.

FIG. 10 shows in a simplified flowchart format the adjust display matrix by discrete values step 608 of FIG. 6. FIG. 10 starts at step 800. From step 800, the method proceeds to step 802 to determine the proper width for the window to accommodate the number of display columns (DisplayCol) that is updated in either of steps 760 or 774 of FIG. 9. In step 802, the method ensures that if DisplayCol columns are displayed in the window, each column has a width that is at least as wide as the predefined minimum column width $W_M$. Consequently, the width of the window after adjustment is the greater of either the width of the existing window or the value [(DisplayCol * $W_M$)+ the width of any margin, scroll bars, and buffer columns].

Note that the formula in step 802 of FIG. 10 works for the case where all columns have a fixed, similar width. If a display matrix involves columns of variable width, e.g. the display matrix of FIG. 5, the width of the window after adjustment is the greater of either the width of the existing window or the sum of the width of all display columns after the addition of an additional column of matrix cells plus and the width of any margin, scroll bars, and buffer columns.

From step 802, the method proceeds to step 804 to set the state of the decrease activator. In the specific embodiment chosen for illustration purposes, which illustrates a calendar program showing seven days in a week in a matrix format, the state of the decrease activator is set to be equal to (DisplayCol <>1). In other words, if the number of display columns is 1 after adjustment, the decrease activator is disabled, thereby preventing the user from removing the one single remaining column of matrix cells in the future. If the number of display columns after adjustment has a value different than 1, e.g. 2, 3, 4, the decrease activator is enabled in step 804.

From step 804, the method proceeds to step 806 where the state of the increase activator is determined. In the specific embodiment chosen for illustration purposes, the state of the increase activator is set to be equal to (DisplayCol <>7). In other words, if the value of DisplayCol after adjustment equals 7, the method disables the increase activator to prevent the user from adding an additional column, e.g. an additional day to the seven-day week, to the display matrix. If the value representing DisplayCol after adjustment is any value other than 7, e.g. 3, 4, 5, the method enables the increase activator to permit the user to add an additional column of matrix cells in the future. Note that the number of display columns can never exceed 7 or fall below 1 in accordance with steps 804 and 806 because the method does not permit the addition of an additional column of matrix cells if DisplayCol is 7. Likewise, the method does not permit the removal of a display column of matrix cells if DisplayCol is 1. If DisplayCol is other than 1, the decrease activator is enabled to permit the removal of at least one column of matrix cells. From step 806, the method proceed to step 808 where the steps of FIG. 10 end.

In an alternative embodiment, the increase activator is disabled if it is determined that the addition of the next minimum width column will cause the existing window to be expanded beyond its predefined maximum size. In another embodiment, the status of the increase and decrease activators are determined by predicting into the future whether an additional column may be displayed in the window. In one embodiment, after each adjustment, the method fetches the width of the next column to be added and performs a test run in memory to determine whether the increase activator should be disabled to prevent the user from adding the next column of matrix cells. For example, if the existing window already occupies most of the display screen and the addition of the next column of matrix cells would require the window to be enlarged beyond what could be shown on the display screen, the method preferably disables the increase activator before the user can attempt this impossible task.

Further, although the status of the increase and decrease activators are shown to be updated after a window width adjustment, it is preferable to update the status of these activators after every activation of either the increase activator or the decrease activator, whenever the window itself is resized, e.g. enlarged or reduced in size by dragging on the window size box, or when a row or a column, e.g. a spreadsheet column, is increased in width and all other columns were shifted in order to accommodate the enlarged column.

In the preferred embodiment, it is preferable that the window dimensions remain unchanged responsive to the activation of the decrease activator. Each time a column of matrix cells is removed from the display matrix, the remaining columns are preferably enlarged proportionally in width to take maximum advantage of the available display area inside the window. If there are any gaps between the expanded column of matrix cells and the boundaries of the matrix display area, due to, e.g. remainder pixels, the flexible storage column, e.g. column 222 of FIG. 3A, may be expanded to fill in the gap or the window itself may be reduced in size to eliminate such gaps. However, in certain applications, e.g. in spreadsheets where each column has a predefined width, the window width may be shrunk as a column of matrix cells is removed in order to maintain the visual aesthetics of the display and to maximize efficient usage of the display screen when there are multiple windows displayed in the display screen.

Although the foregoing invention has been described in some detail for purpose of clarity of understanding, it will be apparent that certain changes and modifications may be practiced within the scope of the appended claims. For instance, although the specification has described in detail different methods for determining the status of the increase and decrease activators, displaying the columns in a matrix display area, and adjusting the size of the window after a valid increase activator is received, these steps do not, in some instances, have to follow the exact sequence described and may be modified to achieve substantially the same result by one skilled in the art without departing from the scope and spirit of the present invention.

Further, although the invention is described using flowcharts as an illustration aid, it should be noted that the methods and apparatus of the present invention may be event-driven, capable of executing multiple processes at the same time. As such, different processes and tasks do not necessarily have to be performed in the specific sequential order chosen for illustration, and a computer implementing the inventive method may be executing other tasks while executing the inventive method disclosed herein.

As a further example, although the specific embodiment is described in detail with reference to a specific program that utilizes activators to increase or decrease the number of columns in a discrete, stepwise manner, it should be apparent to those of skills in the art that the apparatus and methods disclosed herein may be readily adapted to work with applications that increase or decrease the number of rows of matrix cells in a display matrix. The disclosed apparatus and methods may also be adapted to work with applications that discretely and in a stepwise manner adjust both the number of rows and columns.

Although the specific embodiment discusses in great detail, for the illustration purposes, the addition and removal of a column in a calendar program, the invention is neither limited to calendar programs or to columns. In fact, it is within the abilities of one skilled in the art to adapt the invention to specifically work with spreadsheet programs. In the same manner, although the decrease activator is disabled when the number of columns reaches 1 in the specific embodiment, this specific value may be changed as necessary to adapt the invention to work with other specific applications. The same is true for the increase activator, which is disabled in the specific embodiment when the number of column of matrix cells is increased to 7. Such adaptation, as well as others within the abilities of those of skills in the art, may be performed on the apparatus and methods disclosed herein without departing from the scope and spirit of the present invention. Consequently, the scope of the invention is not limited to the specific examples given herein but is set forth in the appended claims.

What is claimed is:

1. A method of modifying a display matrix in a matrix display area in a window on a computer display screen, comprising:

displaying data in a matrix format, thereby frowning a display matrix in said matrix display area, said matrix display area having a first dimension;

increasing, responsive to a selection of an increase activator, the number of existing columns of matrix cells in said display matrix by adding an additional column of matrix cells to said display matrix;

computing, using a central processing unit, a computed width of a column of matrix cells in said existing columns of matrix cells if said column of matrix cells is reduced in width to accommodate said additional column of matrix cells;

reducing said width of said column of matrix cells to accommodate said additional column of matrix cells within said first dimension if said computed width does not fall below a predefined minimum column width; and automatically increasing a width of said matrix display area to accommodate said additional column of matrix cells if said computed width falls below said predefined minimum column width.

2. The method of claim 1 further comprising:

disabling said increase activator to prevent a user from selecting said increase activator if another addition of another column of matrix cells would increase the total number of columns in said matrix display area, after said another addition, beyond a predefined maximum number.

3. The method of claim 1 further comprising:

disabling said increase activator to prevent a user from selecting said increase activator if another addition of another column of matrix cells would increase a width of said window area beyond a predefined maximum window width.

4. The method of claim 1 further comprising:

reducing, responsive to a selection of a decrease activator, the number of existing columns of matrix cells in said display matrix by removing a column of matrix cells chosen for deletion from said display matrix, wherein said matrix display area retains a dimension it has prior to said reducing step.

5. The method of claim 4, wherein said increase activator is visually presented to the user as an increase button, said decrease activator is visually presented to the user as a decrease button, and said selecting is performed with a screen pointer device.

6. The method of claim 4, further comprising:

disabling said decrease activator to prevent a user from selecting said decrease activator if another removal of another column of matrix cells would reduce the total number of columns in said matrix display area, after said another removal, below a predefined minimum number of columns.

7. The method of claim 6 wherein said predefined minimum number of columns is one.

8. The method of claim 1 further comprising:

reducing, responsive to a selection of a decrease activator, the number of existing columns of matrix cells in said display matrix by removing a column of matrix cells chosen for deletion from said display matrix, wherein said matrix display area is reduced in width by an amount equals a width of said column of matrix cells chosen for deletion.

9. The method of claim 1 wherein said increasing step further comprises:

computing an expanded width, said expanded width representing a width of said matrix display area after said additional column of matrix cells is added to said display matrix, said expanded width equals the product of said predefined minimum column width and a total number of columns in said display matrix after said additional column of matrix cells is added to said display matrix.

10. The method of claim 1 wherein said increasing step further comprises:

computing an expanded width, said expanded width representing a width of said matrix display area after said additional column of matrix cells is added to said display matrix, said expanded width equals the sum of the widths of all columns of matrix cells in said display matrix after said additional column of matrix cells is added to said display matrix.

11. A method of modifying a display matrix in a matrix display area in a window on a computer display screen, comprising:

displaying data in a matrix format, thereby forming a display matrix in said matrix display area, said matrix display area having a first dimension;

increasing, responsive to a selection of an increase activator, the number of existing rows of matrix cells in said display matrix by adding an additional row of matrix cells to said display matrix;

computing, using a central processing unit, a computed height of a row of matrix cells in said existing rows of matrix cells if said row of matrix cells is reduced in height to accommodate said additional row of matrix cells;

reducing said height of said row of matrix cells to accommodate said additional row of matrix cells within said first dimension if said computed height does not fall below a predefined minimum row height; and automatically increasing a height of said matrix display area to accommodate said additional row of matrix cells if said computed height falls below said predefined minimum row height.

12. The method of claim 11 further comprising:

disabling said increase activator to prevent a user from selecting said increase activator if another addition of another row of matrix cells would increase the total number of rows in said matrix display area, after said another addition, beyond a predefined maximum.

13. The method of claim 11 further comprising:

disabling said increase activator to prevent a user from selecting said increase activator if another addition of another row of matrix cells would increase a height of said window area beyond a predefined maximum window height.

14. The method of claim 11 further comprising:

reducing, responsive to a selection of a decrease activator, the number of existing rows of matrix cells in said display matrix by removing a row of matrix cells chosen for deletion from said display matrix, wherein said matrix display area retains a dimension it has prior to said reducing step.

15. The method of claim 14, wherein said increase activator is visually presented to the user as an increase button, said decrease activator is visually presented to the user as a decrease button, and said selecting is performed with a screen pointer device.

16. The method of claim 14, further comprising:

disabling said decrease activator to prevent a user from selecting said decrease activator if another removal of another row of matrix cells would reduce the total number of rows in said matrix display area, after said another removal, below a predefined minimum number of rows.

17. The method of claim 16 wherein said predefined minimum number of rows is one.

18. The method of claim 11 further comprising:

reducing, responsive to a selection of a decrease activator, the number of existing rows of matrix cells in said display matrix by removing a row of matrix cells chosen for deletion from said display matrix, wherein said matrix display area is reduced in height by an amount equals a height of said row of matrix cells chosen for deletion.

19. The method of claim 11 wherein said increasing step further comprises:

computing an expanded height, said expanded height representing a height of said matrix display area after said additional row of matrix cells is added to said display matrix, said expanded height equals the product of said predefined minimum row height and a total number of rows in said display matrix after said additional row of matrix cells is added to said display matrix.

20. The method of claim 11 wherein said increasing step further comprises:

computing an expanded height, said expanded height representing a height of said matrix display area after said additional row of matrix cells is added to said display matrix, said expanded height equals the sum of the heights of all rows of matrix cells in said display matrix after said additional row of matrix cells is added to said display matrix.

21. An apparatus for modifying in a discrete, stepwise manner a display matrix comprising of matrix cells arranged in rows and columns in a matrix display area having a first dimension in a window on a computer display screen, comprising:

an increase activator means;

means for increasing, responsive to a selection of said increase activator means, the number of existing columns of matrix cells in said display matrix by adding an additional column of matrix cells to said display matrix;

means for computing a computed width of a column of matrix cells in said existing columns of matrix cells if said column of matrix cells is reduced in width to accommodate said additional column of matrix cells, wherein said width of said column of matrix cells is reduced to accommodate said additional column of matrix cells within said first dimension if said computed width does not fall below a predefined minimum column width, said width of said matrix display area is automatically increased if said computed width falls below said predefined minimum column width;

a decrease activator means; and means for reducing, responsive to a selection of said decrease activator means, the number of existing columns of matrix cells in said display matrix by removing a column of matrix cells chosen for deletion from said display matrix, wherein said matrix display area retains a dimension it has prior to said reducing step.

22. The method of claim 1 wherein said computing step further comprises the step of:

integer dividing a width of said matrix display area by a first number of columns of matrix cells, said first number of column equals a sum of said number of existing columns of matrix cells and said additional column of matrix cells; and if there are remainder pixels left over from said integer dividing step, adding said remainder pixels to a buffer column provided in said window, thereby permitting said buffer column to be displayed with a new width inclusive of said remainder pixels after said additional column of matrix cells is added to said window.

23. The method of claim 4 wherein said computing step further comprises the step of:

integer dividing a width of said matrix display area by a first number of columns of matrix cells, said first number of column equals a value representing of said number of existing columns of matrix cells subtracted by one;

if there are remainder pixels left over from said integer dividing step, adding said remainder pixels to a buffer column provided in said window, thereby permitting said buffer column to be displayed with a new width inclusive of said remainder pixels after said additional column of matrix cells is added to said window.

24. The method of claim 21 wherein said window further comprises:

a buffer column for storing any remainder pixels left over from a computing operation carried out by said computing means in calculating said computed width, said computing operation comprising integer dividing a width of said matrix display area by a first number of columns of matrix cells, said first number of column equals a sum of said number of existing columns of matrix cells and said additional column of matrix cells, said buffer column, after storing said remainder pixels, is displayed in said window with a width inclusive of said remainder pixels.

* * * * *

UNITED STATES PATENT AND TRADEMARK OFFICE
CERTIFICATE OF CORRECTION

PATENT NO. : 5,621,876

DATED : April 15, 1997

INVENTOR(S) : Odam, et al.

It is certified that error appears in the above-identified patent and that said Letters Patent is hereby corrected as shown below:

In the claims:

Column 15, line 65, please delete "frowning" and insert - -forming- -.

Signed and Sealed this

Twenty-fifth Day of May, 1999

Attest:

Q. TODD DICKINSON

*Attesting Officer*     *Acting Commissioner of Patents and Trademarks*